United States Patent [19]

Studer

[11] 4,381,875
[45] May 3, 1983

[54] MAGNETIC BEARING AND MOTOR

[75] Inventor: Philip A. Studer, Silver Spring, Md.

[73] Assignee: The United States of America as represented by the Administrator of the National Aeronautics and Space Administration, Washington, D.C.

[21] Appl. No.: 364,093

[22] Filed: Mar. 31, 1982

[51] Int. Cl.³ .................................. F16C 39/00
[52] U.S. Cl. .................................... 308/10
[58] Field of Search .......................... 308/10

[56] References Cited

U.S. PATENT DOCUMENTS

| 2,153,565 | 4/1939 | Isaacson | 308/10 |
|---|---|---|---|
| 3,698,775 | 10/1972 | Gilbert | 308/10 |
| 3,865,442 | 2/1975 | Studer | 308/10 |
| 3,888,553 | 6/1975 | Wehde | 308/10 |
| 4,000,929 | 1/1977 | Studer | 308/10 |
| 4,037,886 | 7/1977 | Boden et al. | 308/10 |
| 4,040,681 | 8/1977 | van der Heide | 308/10 |
| 4,072,370 | 2/1978 | Wasson | 308/10 |
| 4,080,012 | 3/1978 | Boden et al. | 308/10 |
| 4,320,927 | 3/1982 | Sertich | 308/10 |
| 4,353,602 | 10/1982 | Habermann | 308/10 |

FOREIGN PATENT DOCUMENTS

| 2655066 | 8/1977 | Fed. Rep. of Germany | 308/10 |
|---|---|---|---|
| 660152 | 6/1979 | U.S.S.R. | 308/10 |

*Primary Examiner*—R. Skudy
*Attorney, Agent, or Firm*—John O. Tresansky; John R. Manning; Robert E. Bushnell

[57] ABSTRACT

A magnetic bearing assembly (10) has an intermediate rotatable section (33) having an outer cylindrical member (30) coaxially suspended by a torsion wire (72) around an axially polarized cylindrical magnet (32). Axial alignment between the pole faces (40–43) of the intermediate section (33) and end surfaces (50–53) of opposed end bells (20, 22) provides a path of least reluctance across intervening air gaps (60–63) for the magnetic flux emanating from magnet (32). Radial dislocation increases the reluctance and creates a radial restoring force. Substitution of radially polarized magnets 107 fixed to a magnetically permeable cylinder (32') and insertion of pairs of armature coil windings (109–112) between the cylinder pair (33') provides an integral magnetic bearing and torsion motor (100) able to provide arcuately limited rotational drive.

20 Claims; 10 Drawing Figures

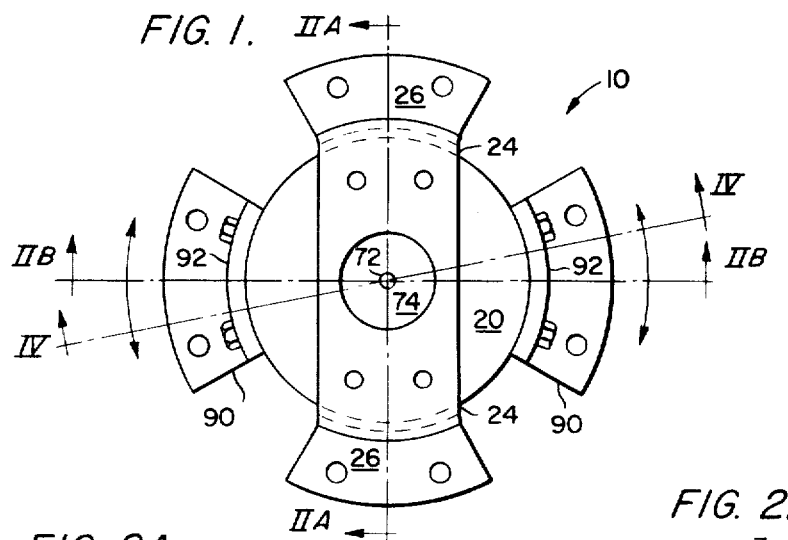
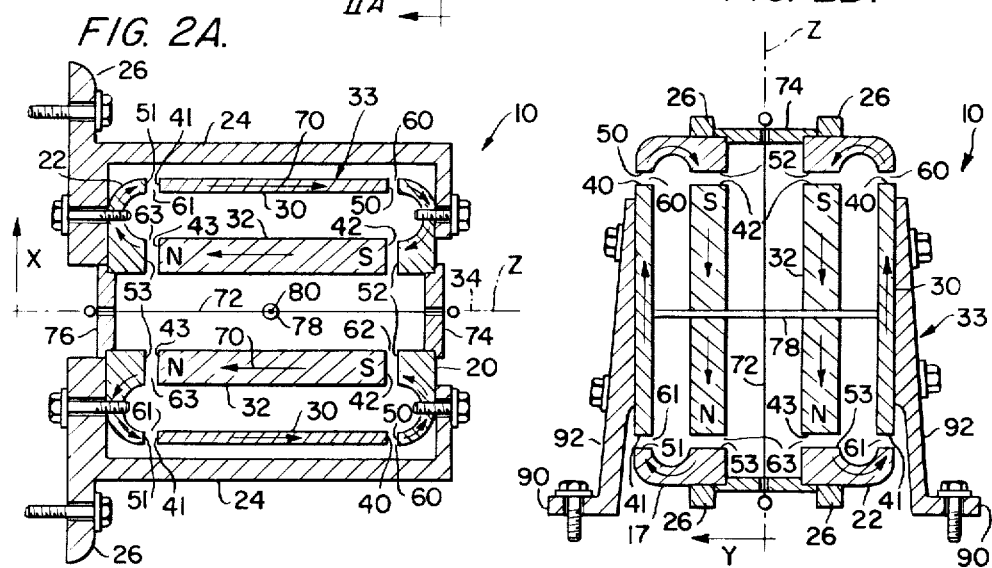
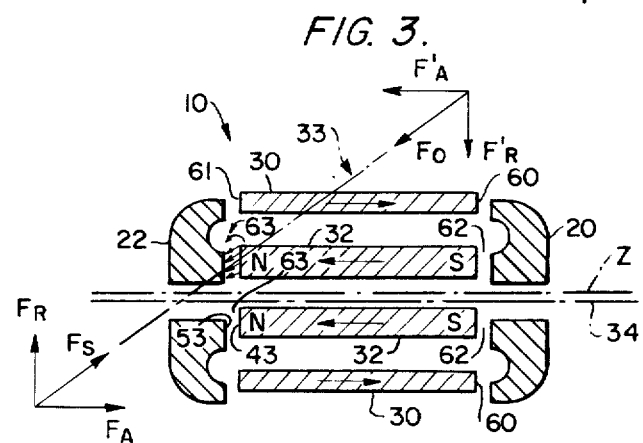

MAGNETIC BEARING AND MOTOR

ORIGIN OF THE INVENTION

The invention described herein was made by an employee of the United States Government and may be manufactured and used by or for the Government for governmental purposes without the payment of royalties thereon or therefor.

TECHNICAL FIELD

This invention relates to bearings for rotating machinery and, more particularly, to magnetic suspension bearings and integral drive motors for rotatable machine elements.

BACKGROUND ART

Shaft supported rotatable machine members are usually stabilized against axial and radial thrust forces by bearings supporting one or both shaft ends. Prior art bearings, whether of the shaft rubbing or magnetic non-contacting type, generally provide stability by restraining five degrees of shaft freedom. These are radial dislocation of the shaft with respect to mutually orthogonal X and Y axes, tilting of the shaft with respect to either of the X or Y axes, and axial shifting of the shaft along its longitudinal axis. Neither type of bearing is particularly well suited, however, to suspension of slowly rotating shafts such as those driven through oscillating rotational cycles or over arcs of less than one complete turn per cycle.

Shaft rubbing type bearings, such as ball and race bearings or slip ring bearings require periodic lubrication to prevent microwelding or debris accumulation. Adequate liquid lubrication cannot be assured over periods of time on the order of years for shafts operated at low speeds, particularly in an operational environment such as outer space where an ambient vacuum causes liquid lubricants to evaporate. Dry film type lubricants, such as graphite and molybdenum disulfide, have hygroscopic tendencies and leave deposits of debris after a prolonged period of time, characteristics which eventually impair shaft rotation of a machine member supported by the bearing.

Previous efforts to avoid these disadvantages have focused on exotic lubricants and upon non-contacting type rotating bearings such as magnetic bearings. Magnetic bearings avoid the disadvantages of shaft rubbing bearings by eliminating dynamic contact between the shaft and the bearing. Reliable performance of presently available magnetic bearings, however, is typically dependent upon continuous, error-free operation of shaft position sensing and servo-control electronic networks. Implementation of such networks is quite recent and their lack of demonstrated reliability has impeded somewhat acceptance of magnetic suspension bearings by engineers and machine designers. Furthermore, some difficulties have been encountered in combining permanent magnet biased shaft bearings with electric motors for driving a shaft. A large, negative radial force gradient occurs unless the permanent magnet bearing assembly and the iron motor armature are perfectly concentric. Even slight eccentricities create a net radial decentering force due to the forces of attraction between the permanent magnet assembly and the motor armature. Previous efforts to avoid decentering forces have used different flux paths for the motor field and the magnetic bearing assembly thereby incurring the volume and mass of some additional ferromagnetic material necessary to provide the extra flux path.

STATEMENT OF INVENTION

Accordingly, it is one object of the present invention to provide passive axial stabilization and radial centering of rotatable shafts.

It is another object to provide a reliable suspension for axially stabilizing and radially centering rotatable shafts.

It is yet another object to provide a rotatable shaft bearing able to reliably function for long periods without maintenance.

It is also an object to provide a light-weight, reliable magnetic suspension bearing and integral rotary drive motor.

It is a further object to provide a self-centering magnetic suspension bearing and integral rotary drive motor.

It is a still further object to provide a rotary drive motor and integral magnetic suspension bearing free of intrinsic decentering forces.

These and other objects are achieved by a passive magnetic bearing for arcuately limited rotation using a taut wire stretched along the longitudinal axis of the bearing between opposed end pieces as a torsion spring to provide axial stability between the end pieces and an intermediate magnetic section. The intermediate section is segmented to provide oppositely directed magnetic flux paths between the end pieces and may include either an axially polarized magnet forming one segment or a plurality of radially polarized magnets interposed between the segments. The end pieces, separated from the intermediate section by air gaps, control distribution of magnetic flux between the intermediate section segments. Coaxial alignment of the end pieces with the intermediate section minimizes magnetic reluctance in the flux paths thereby endowing the bearing with self-centering characteristics when subjected to radial loading.

In an alternative embodiment, pairs of oppositely wound armature coils may be concentrically interposed between segments of the intermediate section in concentric arcs adjacent radially polarized magnets to equip a magnetic bearing as a torsion drive motor.

BRIEF DESCRIPTION OF THE DRAWINGS

A more complete appreciation of the invention and many of the attendant advantages thereof will be readily apparent as the same becomes better understood by reference to the following detailed description when considered in conjunction with the accompanying drawings in which like reference symbols indicate the same or similar components, and wherein:

FIG. 1 is an end view of one embodiment of a magnetic bearing assembly.

FIG. 2A is a front sectional view taken along line IIA—IIA of FIG. 1.

FIG. 2B is a front sectional view taken along line IIB—IIB of FIG. 1.

FIG. 3 is a magnetic circuit diagram based upon the magnetic structure of FIG. 2.

DETAILED DESCRIPTION OF THE INVENTION

Figure 3A:
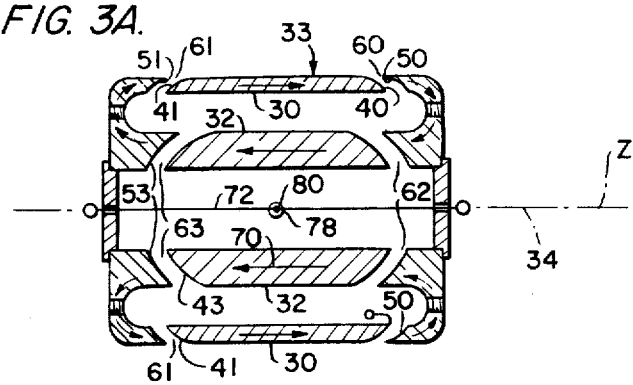
FIG. 3A is a front sectional view of an alternative embodiment of a magnetic bearing assembly.

In the drawings, FIGS. 1, 2A and 2B illustrate a magnetic bearing 10 for passively suspending a rotatable element (not shown) subjected to axial and radial thrust forces. The bearing includes end pieces, or bells, 20, 22 held in facing opposition by being bolted to the ends of an elongated bracket 24. A pair of flanges 26 are formed on one end of bracket 24 and may be secured to a stationary structural member 28 such as a machine frame. An outer elongated casing member 30, such as a hollow cylinder formed of a low magnetic reluctance material, is concentrically positioned around an inner hollow cylindrical magnet 32 to form a cylinder pair 33. Magnet 32 is axially polarized along its longitudinal axis Z. End bells 20, 22 each define a pair of facing concentric end surfaces 50, 51 and 52, 53 respectively, axially aligned along a central axis 34 which is coaxial with longitudinal axis Z when bearing 10 is in its equilibrium position with the corresponding base or pole faces 40, 41 and 42, 43, respectively, of outer member 30 and magnet 32. Air gaps 60, 61, 62 and 63 separate adjacent pairs of pole faces and end surfaces 40-51, 41-51, 42-52, and 43-53, respectively. Magnet 32 creates an external magnetic field which flows through a magnetic circuit 70 extending axially from the north pole, N, of magnetic 32, across air gap 63, radially through end bell 22 between pole faces 43, 41, axially across air gap 61, outer member 30, and air gap 60, radially through end bell 20 between pole faces 40, 42, axially across air gap 62 to the south pole, S, of magnet 32. A pair of brackets 92 are bolted to opposite sides of outer casing member 30 in quadrature with brackets 24. Brackets 92 have flanges 90 which may be connected to a machine member that is rotatable about the longitudinal axis Z.

The surface areas of each end surface 50-53 of end bells 20, 22 and pole faces 40-43 of outer member 30 and magnet 32 in corresponding adjacent pairs are preferably made approximately equal so that any change in radial alignment between adjacent facing pairs causes an immediate decrease in the effective or matched surface area between adjacent pairs. When outer member 30 and magnet 32 are radially aligned with end bells 20, 22, the effective surface areas between pole faces 40-43 and end surfaces 50-53 are at their maximum values and the distances or air gaps 60-63 separating them are at their minimum values. Magnetic reluctance of the air gaps 60-63 is directly proportional to the distance, d, separating adjacent pole faces 40-43 and end surfaces 50-53 and inversely proportional to the effective area, $A_{eff}$, between adjacent pole faces and end surfaces. In effect, magnetic reluctance of the air gaps is determined by:

$$r = k(d/A_{eff}) \quad (1).$$

When outer member 30 and magnet 32 are radially aligned with end bells 20, 22, magnetic reluctance of the air gaps 60-63, particularly, and of the entire magnetic circuit is at a minimum value.

FIG. 3 is a vector diagram illustrating the restoring forces $F_R$, $F_R'$ which occur upon any radial excursion of outer member 30 and magnet 32 relative to end bells 20, 22. Magnetic flux always seeks a magnetic circuit or flux path of least reluctance. Radial dislocation increases the reluctance across air gaps 60-63. The magnetic forces resulting from the magnetic fields across the air gaps assume the same directions as the corresponding lines of flux. At air gap 63, for example, radial dislocation causes a shift in the direction of the lines of magnetic flux across the air gap and, consequently, of the forces of magnetic attraction $F_S$, $F_O$, respectively, between pole face 43 and end surface 53. When shifted as shown, the forces of attraction exhibit radial components $F_R$, $F_R'$ as well as axial components $F_A$, $F_A'$. Magnet 32 is freely moveable with respect to end bell 22. Therefore, radial components $F_R$ and $F_R'$ tends to oppose the radial dislocation between pole face 43 and end surface 53. Similar radial components are created by the dislocation at the other air gaps resulting in a net radial force opposing the dislocation and tending to force member 30, magnet 32, and end bells 20, 22 back into radial alignment to restore the magnetic circuit to a condition of least reluctance. Minimum reluctance occurs during precise alignment of the concentric pole faces 40, 42 and 41, 43 with the adjacent concentric end surfaces 51, 53 and 50, 52 respectively. The efforts of magnetic circuit 70 to preserve a condition of minimum reluctance creates some radial stiffness in magnetic bearing 10. This causes bearing 10 to exhibit a passive self-centering characteristic in the presence of applied radial loads thereby providing a gimbal bearing function when coupled to a rotatable machine element (not shown).

Magnetically, bearing 10 is in unstable equilibrium axially with strong magnetic forces of attraction tending to close the airgaps 60-63. These axial forces are restrained by a torsion wire 72, as shown in FIGS. 2A and 2B, suspended under tension between two stationary circular end plates 74, 76 coaxially abutting opposite end bells 20, 22, respectively. Torsion wire 72 is attached to outer member 30 and cylindrical magnet 32 by a bar 78 formed of a non-magnetic material. The ends of bar 78 pass through magnet 32 to outer member 30. Bar 78 is rigidly attached to both inner member 30 and magnet 32 and holds them concentrically spaced apart. End plates 74, 76 hold opposite ends of torsion wire 72 stationary; rotation of the cylinder pair 33 of outer member 30 and magnet 32 relative to end plates 74, 76 causes wire 72 to twist thereby converting rotation of cylinder pair 33 into torsion. If wire 72 is relatively thin, its twisting will produce only a very small angular spring effect. Wire 72 may be made of a multiplicity of taut wires to increase the load capacity of bearing 10 without increasing its angular stiffness. Alternatively, a single rod may be substituted for wire 72; although a rod would absorb relatively little rotation from cylinder pair 33, it would adequately suspend the cylinder pair between end bells 20, 22.

Bracket pairs 24 and 92, although arranged in quadrature about axes 34, Z with flanges 26, 90 on the same end of the bearing, are connectable to different machine members (not shown). Flanges 26 may be bolted to a stationary machine member such as a frame, while flanges 90 of bracket 92 may be bolted to a different machine member rotating about longitudinal axis Z relative to the stationary machine member. When one set of flanges 26 or 90 are attached to a stationary machine member, the quadrature arrangement of the brackets prevents more than a few degrees of rotation between cylinder pair 33 and end bells 20, 22.

In an application of the invention, a rotatable machine member (not shown) to be suspended is mounted on a shaft and opposite ends of the shaft are held between two bearing assemblies 10. Static load of the rotatable machine member perpendicular to the axis of machine rotation acts on a lever arm of one-half of the distance between bearing assemblies and is restrained by the passive self-centering characteristics of each unit. If the length-to-diameter ratio of the cylinder pair 33 is large, the bearing assemblies 10 will be inherently stable and retain their self-centering characteristics despite the static loading applied by a rotatable machine. The bearings become less stable as the length-to-diameter ratio is decreased because flat pole faces are individually inherently unstable in the presence of torsional loads. This torsional instability may be reduced by making pole faces 40–43 and end surfaces 50–53 spherical about the centroid 80 of the combined intermediate and end sections of the bearing assembly in the manner shown in FIG. 3A. Spherical pole faces and end surfaces enhance the self-centering characteristics of the bearing assembly by rendering its torsional stability independent of the length-to-diameter ratio.

When properly constructed, the tendency for cylinder pair 33 to maintain magnetic flux paths of least reluctance between the pole faces and adjacent end surfaces endows bearing assembly 10 with self-centering characteristics while allowing rotation subject to the small torsional spring restraint introduced by taut wire 72. When its bracket flanges are connected between relatively rotatable machine members, the bearing assembly provides five degrees of freedom to the machine members while allowing rotation subject to the torsional spring restraint introduced by taut wire 72.

Figure 4:
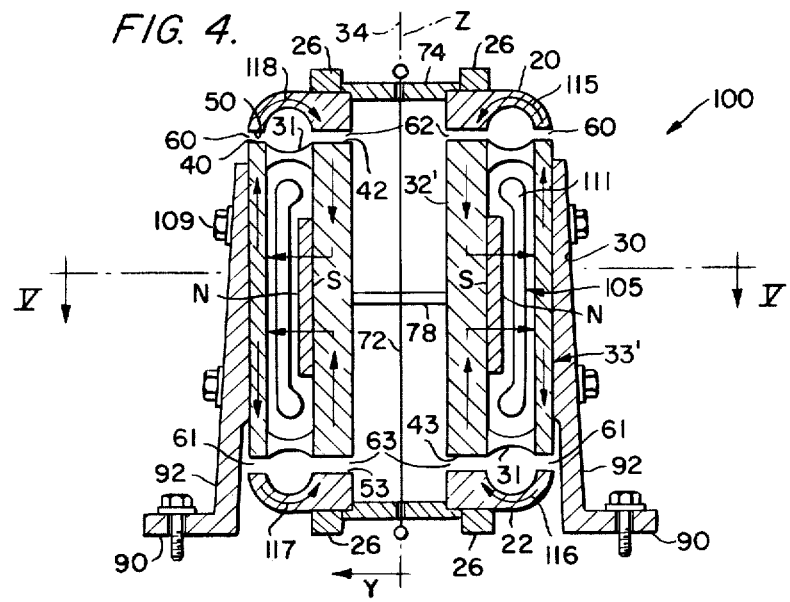
FIG. 4 is a side sectional view taken along line IV—IV of FIG. 1 showing another alternative embodiment.
Figure 5:
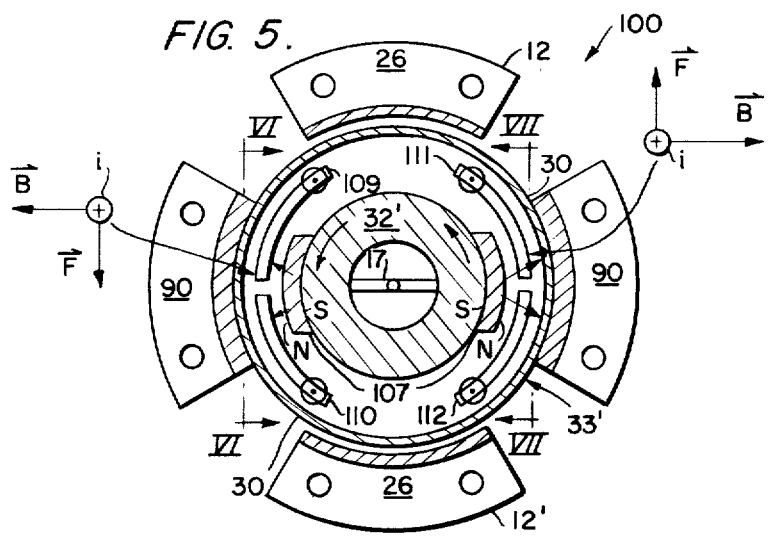
FIG. 5 is a side sectional view taken along line V—V of FIG. 4.

FIGS. 4 and 5 illustrates an alternative magnetic bearing assembly 100 embodiment containing a small integral torsional rotary drive motor 105 to provide relative rotation about the longitudinal axis Z between cylinder pair 33 and end bells 20, 22.

In this embodiment in which cylinder pair 33' includes an unpolarized outer cylinder 30 coupled via a plurality of intermediate bridges 31 formed of a nonmagnetic material to an unpolarized inner cylinder 32'. Opposed inner faces of inner cylinder 32' are connected to torsion wire 72 by bar 78. A pair of magnets 107, radially polarized with their north poles, N, radially outward of their south poles, S, are axially symmetrically secured to opposed faces of inner cylinder 32'. Two pairs of oppositely wound armature coil windings 109, 110, 111 and 112 are interposed between corresponding magnets 107 and the inner surface of outer cylinder 30. If bearing assembly 100 is intended to support a machine element subjected to arcuately limited or oscillating rotation, armature windings 109–112 may be made stationary relative to cylinder pair 33'.

Figure 6:
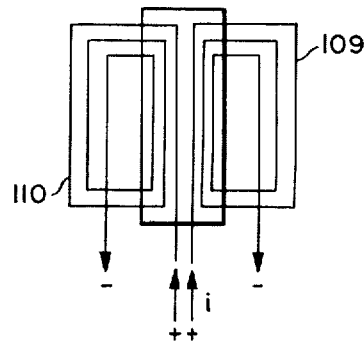
FIG. 6 is a sectional view taken along line VI—VI of FIG. 5 showing the arrangement of one set of armature coil windings.
Figure 7:
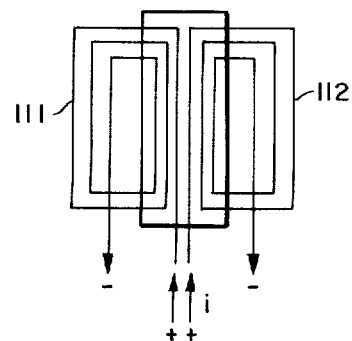
FIG. 7 is a sectional view taken along line VII—VII of FIG. 5 showing the arrangement of another set of armature coil windings.

Bearing assembly 100 provides a pair of oppositely directed magnetic circuits 115, 116 and 117, 118, respectively associated with each of magnets 107. The Magnetic flux in each circuit passes radially outward from the north pole of a magnet 107, axially through outer cylinder 30, through the respective outer end surface 50, 51 across the respective air gap 40, 41 to the respective outer pole face 60, 61, radially inward through the respective end bell 20, 22, through the respective inner pole face 52, 53, axially through the respective inner air gap 62, 63, axially through the respective inner end surfaces 42, 43, axially through inner cylinder 32' to its mid-point, and radially outward to the south pole, S, of the respective magnet 107. This relatively diffuse magnetic flux path reduces the effects of surface roughness and eccentricity of the several bearing elements and thereby minimizes the de-centering effects of non-linear force gradients upon motor performance. The armature windings produce torque on the cylinder pair 33; as a function of direct current flow. When armature coil windings 109, 110, 111 and 112 are energized by a source of direct current (not shown) with the polarities shown in FIGS. 6 and 7, current, i, through the armature coil windings is normal to the magnetic flux $\vec{B}$, flowing between the north pole, N, of magnets 107 and outer cylinder 30. This causes a tangential force $\vec{F}$ to on cylinder pair 33'. These forces $\vec{F}$ create a torque which causes cylinder pair 33' to rotate relative to end bells 20, 22. Flange 26 of bracket 24 is secured to a stationary structural member such as a machine frame. The flanges 90 of brackets 92 are connectable to a rotatable machine element (not shown) such as one end of a shaft. Brackets 92 are connected to diametrically opposite sides of the outer cylinder 30 of cylinder pair 33'. Rotation imparted by bracket 92 is thus translated to torsion wire 72 while torque applied to cylinder pair 33' by torsion motor 105 is transmitted to bracket 92 and any connected machine element. Although only two magnets 107 are shown in the drawings, a bearing assembly may be made with three of more magnets 107 and six or more armature windings symmetrically arrayed around the longitudinal axis Z between the inner 32' and outer 30 members of cylinder pair 33' to enable motor 105 to provide a greater amount of torque.

Figure 8:
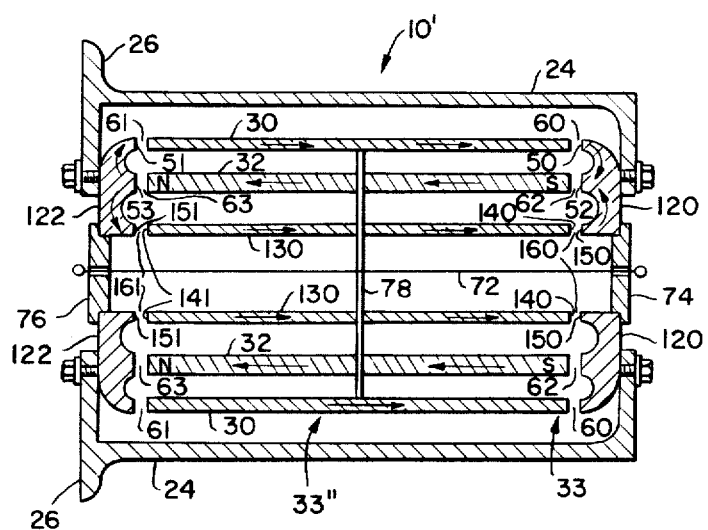
FIG. 8 is a front sectional view of an alternative embodiment of a magnetic bearing assembly.

FIG. 8 illustrates another embodiment of a passive magnetic bearing assembly 10' having a cylinder assembly 33'' constructed with an axially polarized cylinder magnet 32 concentrically positioned between an outer casing member 30 and an inner casing member 130. Bar 78 formed of a non-magnetic material, is attached to magnet 32 and to casing members 30, 130 by such conventional fastening techniques as welding or threaded sections and holds the magnet and casing members separated. End bells 120, 122 are each constructed with three concentric sets of end surfaces 50, 52, 150 and 51, 53 and 151 respectively, axially separated by air gaps 60, 62, 160 and 61, 63, 161 from the corresponding pole faces of the cylinder assemblies. This configuration provides an increased degree of radial stiffness while still allowing rotation about its longitudinal axis 2.

It is apparent, therefore, the torsional magnetic bearings disclosed are self-centering and provide long term, maintenance-free stabilization particularly suited to rotatable machine elements subjected to axial and radial thrust forces. These bearings eliminate wear and failure prone elements and avoid such difficulties encountered in prior art bearings as lubricant deposits without incurring the inherent risk of premature failure of such ancillary elements as electronic sensing and servo-control networks. Additionally, the versatility of these bearings makes them easily amenable to integration with torsion motors without requiring the weight of additional ferromagnetic material necessary to provide separate flux paths.

I claim:

1. A magnetic bearing, comprising:
   means (33) having a plurality of segments (30, 32/32'/107) aligned along a longitudinal axis (Z) for providing oppositely directed magnetic flux paths;
   said plurality of segments including magnet means (32/107) symmetrically positioned around said longitudinal axis for producing magnetic fields within said flux paths, and having arrays of pole faces (40-43) concentric about said longitudinal axis;
   a plurality of means (20, 22) having arrays of end surfaces (50-53) concentrically arrayed about a common axis (34), separated from said end pieces by air gaps (60-63) for controlling flux distribution between said pole faces;
   first bracket means (24, 26) connectible to a first machine member for holding said plurality of controlling means (20, 22) in fixed, axially aligned separation; and
   second bracket means (90, 92) for connecting said magnetic flux path providing means (33) to a second machine member rotatably associated with said first machine member.

2. The bearing of claim 1 further comprising:
   means (72) held in tension between said controlling means (20, 22) for suspending said pole faces (40-43) of said magnetic flux path providing means (33) in spaced relation between said end surfaces (50-53); and
   means (78) formed of a non-magnetic material for connecting said magnetic flux path providing means (33) to said suspending means (72).

3. The bearing of claim 1 further comprising:
   means (72) held in tension between said controlling means (20, 22) for converting angular rotation between said magnetic flux path providing means (33) and end surfaces (50-53) into torsion; and
   means (78) formed of a non-magnetic material for connecting said magnetic flux path providing means (33) to said converting means (72).

4. The bearing of claims 2 or 3 wherein said plurality of segments comprise cylindrical casings (30, 32/32') coaxially positioned about said longitudinal axis (Z) and bases of said casings define said pole faces (40-43).

5. The bearing of claim 4 wherein said cylindrical casings (30, 32) are structurally joined by said connecting means (78).

6. The bearing of claims 2 or 3 wherein said magnet means (32) has an axis of polarization substantially axially aligned parallel to said longitudinal axis (Z).

7. The bearing of claim 6 wherein said magnet means (32) and another of said plurality of segments (30) comprise cylindrical casings coaxially aligned along said longitudinal axis (Z) and bases of said casings define said pole faces (40-43).

8. The bearing of claim 7 wherein said cylindrical casings are structurally joined by said connecting means (78).

9. The bearing of claim 6 wherein said magnet means (32) and other (30, 130) of said plurality of segments comprise cylindrical casings coaxially aligned substantially parallel to said longitudinal axis (Z) with said magnet means interposed between said other plurality of segments and bases of said casings define said pole faces (40-43, 140, 141).

10. The bearing of claim 9 wherein said cylindrical casings are structurally joined by said connecting means (78).

11. The bearing of claims 2 or 3 wherein said magnet means (107) includes a plurality of elements each having an axis of polarization substantially aligned normal to said longitudinal axis (Z).

12. The bearing of claim 11 further comprising a plurality of means (109-112) concentrically arrayed in radial correspondence with said magnet means elements (107) for conducting electrical currents in oppositely directed loops perpendicularly to said axes of polarization.

13. A magnetic bearing, comprising: means (33) including casing members (30/30, 32') having opposite pole faces (40, 41/40-43) concentric about a longtudinal axis for providing at least one magnetic flux path;
    said flux path providing means (33) also including means (32/107) concentric about said longitudinal axis (Z) for producing an external magnetic field;
    means having opposed members (20, 22) formed of low magnetic reluctance having concentric end surfaces (50-53) separated by air gaps (60, 61/60-63) from said pole faces, for controlling distribution of magnetic flux across said air gaps;
    means (24, 26) connectable to a first machine member for holding said opposed members (20, 22) in axial separation;
    means (90, 92) connectable to a second machine member rotatable about said longitudinal axis relative to said first machine member for connecting said flux path providing means (33) to said second machine member.

14. The bearing of claim 13 wherein said field producing means (32) exhibits an axis of polarization substantially parallel with said longitudinal axis (Z).

15. The bearing of claim 14, further comprising:
    means (78) concentrically separating said path providing means (30/30, 32') and said field producing means (32/107); and
    means (72) connected to said separating means (78) and held in tension between said opposed members (20, 22) for absorbing rotation of said separating means as torsion.

16. The bearing of claim 13 wherein said field producing means (107) comprises a plurality of symmetrically arrayed elememts (107) exhibiting axes of polarization substantially normal to said longitudinal axis (Z).

17. The bearing of claim 16 wherein said casing members (30, 32') comprises:
    an inner elongated casing member (32') having a central axis substantially coaxial with said longitudinal axis (Z);
    an outer elongated casing member (30); and
    non-magnetic means (31) for holding said outer elongated member (30) concentrically about said inner elongated member (32') on opposite sides of said field producing means (107) elements.

18. The bearing of claim 17 further comprising a plurality of means (109-112) concentrically interposed between said inner (32') and outer (30) elongated members in conjunction with said field producting means elements (107) for subjecting said elongated members to rotational torque about said central axis when energized by electrical currents flowing orthogonally to adjacent segments of said magnetic flux.

19. The bearing of claim 17 further comprising a plurality of sets of oppositely wound pairs of coils (109-112) concentrically arrayed between said inner (32') and outer (30) elongated members in arcuate planes perpendicular to corresponding of said axes of polarization.

20. The bearing of claims 15 or 17 wherein facing pairs of said pole faces (40-43) and end surfaces (50-53) separated by said air gaps (60-63) have equal surface areas.

* * * * *